United States Patent
Correia et al.

(10) Patent No.: US 9,731,631 B2
(45) Date of Patent: Aug. 15, 2017

(54) MOTOR VEHICLE SEAT HAVING A REVERSIBLE SITTING PART WITH AN OPENING FOR THE PASSAGE OF A BASE FOR SECURING A SAFETY BELT

(71) Applicant: RENAULT s.a.s., Boulogne, Billancourt (FR)

(72) Inventors: Miguel Correia, Pierres (FR); Guillaume Brotonne, Septeuil (FR); David Lancelot, Gemigny (FR)

(73) Assignee: RENAULT s.a.s., Boulogne Billancourt (FR)

( * ) Notice: Subject to any disclaimer, the term of this patent is extended or adjusted under 35 U.S.C. 154(b) by 58 days.

(21) Appl. No.: 14/772,032

(22) PCT Filed: Feb. 17, 2014

(86) PCT No.: PCT/FR2014/050319
§ 371 (c)(1),
(2) Date: Sep. 1, 2015

(87) PCT Pub. No.: WO2014/131965
PCT Pub. Date: Sep. 4, 2014

(65) Prior Publication Data
US 2016/0016487 A1   Jan. 21, 2016

(30) Foreign Application Priority Data

Mar. 1, 2013   (FR) ...................................... 13 51871

(51) Int. Cl.
*B60N 2/20*   (2006.01)
*B60N 2/02*   (2006.01)
(Continued)

(52) U.S. Cl.
CPC ............. *B60N 2/203* (2013.01); *B60N 2/015* (2013.01); *B60N 2/028* (2013.01); *B60N 2/0292* (2013.01);
(Continued)

(58) Field of Classification Search
CPC .......... B60N 2/38; B60N 2/688; B60N 2/203; B60N 2/015; B60N 2/0292; B60N 2/10;
(Continued)

(56) References Cited

U.S. PATENT DOCUMENTS 685,663 A * 10/1901 Avery .................... A47C 7/022
                                                              297/244
4,099,770 A * 7/1978 Elsholz ................. B60R 22/105
                                                              297/216.11
(Continued)

FOREIGN PATENT DOCUMENTS

FR    2 950 005        3/2011
WO    02 097308        12/2002

OTHER PUBLICATIONS

International Search Report Issued Apr. 22, 2014 in PCT/FR2014/050319 Filed Feb. 17, 2014.
(Continued)

*Primary Examiner* — Milton Nelson, Jr.
(74) *Attorney, Agent, or Firm* — Oblon, McClelland, Maier & Neustadt, L.L.P.

(57) ABSTRACT

A motor vehicle seat including a sitting part including a base panel bordered at least partially by a side panel, the sitting part configured to be mounted on the vehicle floor panel in two different positions of: a first accommodating position, in which the side panel extends in a first direction, at the rear of the base panel and forms a portion of the seatback of the seat, and a second reversed position, in which the side panel extends in front of the base panel, in a second direction
(Continued)

opposite the first. The sitting part further includes an opening configured for passage of a base for securing a safety belt when the sitting part is in the accommodating position. A motor vehicle can include the seat.

9 Claims, 5 Drawing Sheets

(51) Int. Cl.
    *B60N 2/10*     (2006.01)
    *B60R 7/04*     (2006.01)
    *B60N 2/38*     (2006.01)
    *B60N 2/64*     (2006.01)
    *B60N 2/68*     (2006.01)
    *B60N 2/015*     (2006.01)
    *B60R 22/18*     (2006.01)

(52) U.S. Cl.
    CPC ................ *B60N 2/10* (2013.01); *B60N 2/38* (2013.01); *B60N 2/643* (2013.01); *B60N 2/646* (2013.01); *B60N 2/686* (2013.01); *B60N 2/688* (2013.01); *B60R 7/043* (2013.01); *B60R 2022/1806* (2013.01)

(58) Field of Classification Search
    CPC ........ B60N 2/643; B60N 2/646; B60N 2/686; B60N 2/028; B60R 2022/1806; B60R 7/043
    USPC .................... 297/3, 283.2, 283.1, 94, 452.24
    See application file for complete search history.

(56) References Cited

U.S. PATENT DOCUMENTS

| 4,252,368 | A | * | 2/1981 | Miller | ............... | B60N 2/38 |
|---|---|---|---|---|---|---|
| | | | | | | 297/112 |
| 6,488,327 | B1 | * | 12/2002 | Pearse | ............ | B60N 2/2863 |
| | | | | | | 296/37.15 |
| 7,029,421 | B2 | | 4/2006 | Henneken et al. | | |

OTHER PUBLICATIONS

French Search Report Issued Nov. 20, 2013 in French Application 1351871 Filed Mar. 1, 2013.

* cited by examiner

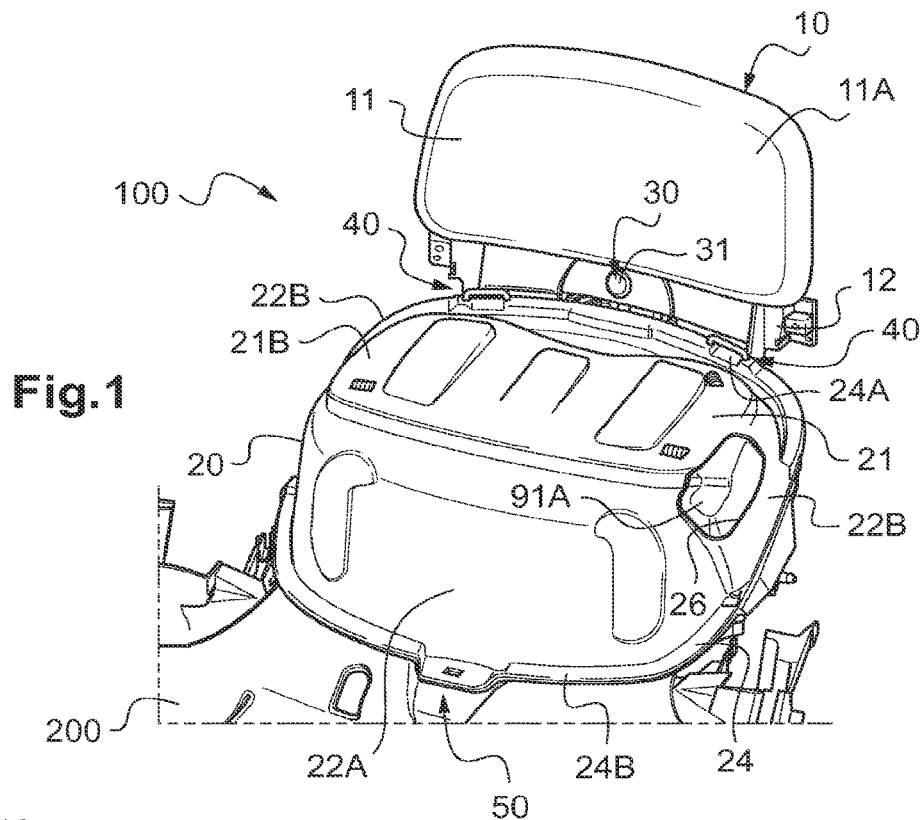
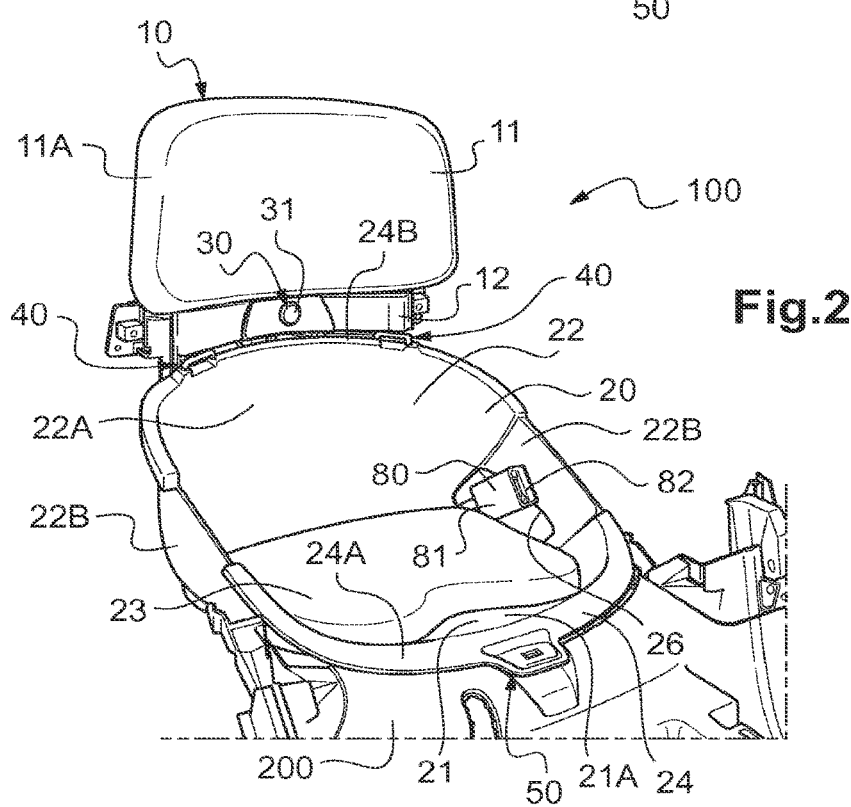

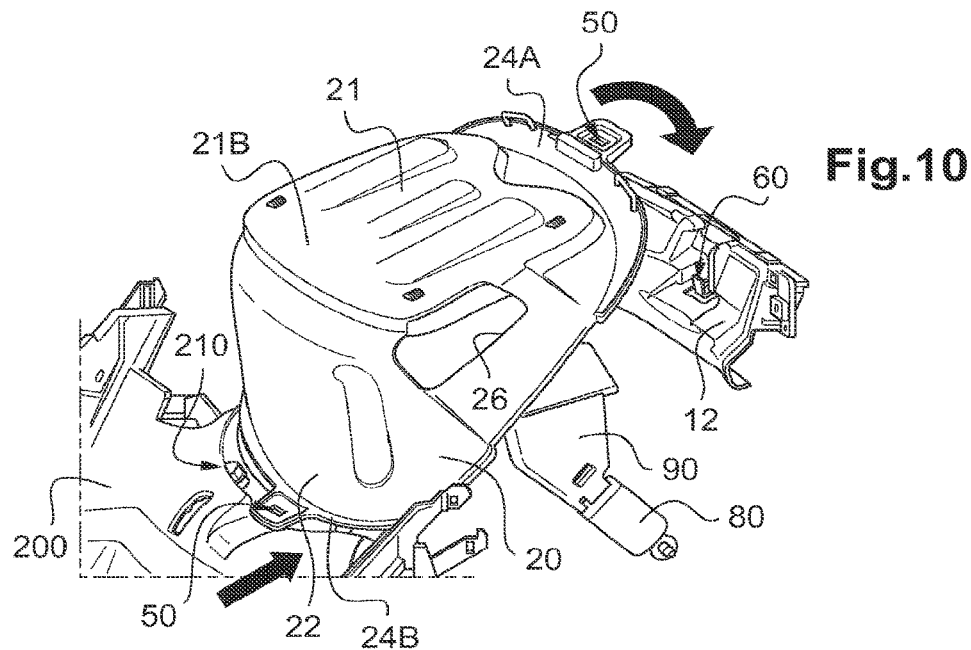
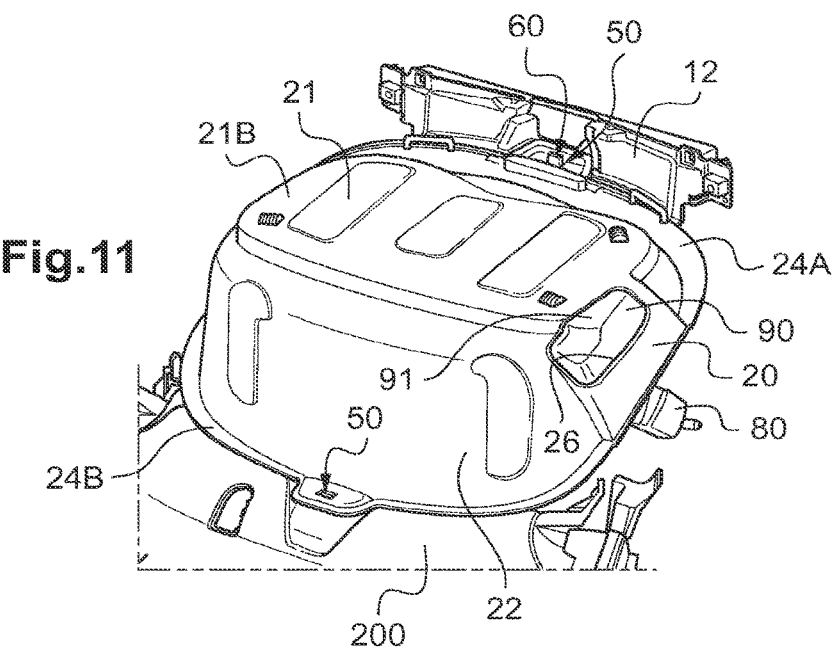

MOTOR VEHICLE SEAT HAVING A REVERSIBLE SITTING PART WITH AN OPENING FOR THE PASSAGE OF A BASE FOR SECURING A SAFETY BELT

TECHNICAL FIELD OF THE INVENTION

The present invention relates to a motor vehicle seat comprising a sitting part provided with a base panel bordered at least partially by a side panel, said sitting part being designed to be mounted on the floor of the vehicle in two different positions: a first accommodating position in which the side panel extends in a first direction at the rear of the base panel and forms a portion of the seatback of the seat, and a second reversed position in which the side panel extends in front of the base panel in a second direction opposing the first direction.

The invention also relates to a motor vehicle comprising such a seat.

TECHNOLOGICAL BACKGROUND OF THE INVENTION

A seat as described in the introduction is disclosed, in particular, in the document FR 2950005.

This seat more specifically comprises an edge which extends along its side panel and cooperates with the peripheral edge of an opening of the floor of the vehicle for the positioning thereof in its accommodating and reversed positions. Moreover, means may be provided for securing the sitting part to the floor.

By a reversal of the sitting part, such a seat makes it possible to pass from a position in which the base panel is lowered and the sitting part forms an integral molded seat designed to accommodate a passenger of the vehicle, into a position in which the base panel is raised and the sitting part forms a cover for a housing arranged below the seat.

In this case a three-point safety belt is provided, said safety belt passing, in particular, over the thighs of the passenger in the reversed position of the sitting part.

A drawback with this solution is that the base of the safety belt is only able to be arranged at the side of the sitting part which does not permit optimal positioning of the safety belt on the passenger in the accommodating position of the sitting part.

SUBJECT OF THE INVENTION

In order to remedy the aforementioned drawback of the prior art, the present invention proposes a motor vehicle seat having a reversible sitting part permitting optimal positioning of the base for securing a safety belt when the sitting part is in the accommodating position.

More particularly, according to the invention, a seat is proposed as defined in the introduction in which the sitting part further comprises an opening designed for the passage of a base for securing a safety belt when the sitting part is in the accommodating position thereof.

Firstly, therefore, it is possible to position the base for securing the safety belt in the closest possible position to the passenger seated on the seat, since the base for securing passes through the opening of the sitting part and protrudes inside the sitting part in its accommodating position.

Secondly, the seat advantageously comprises a sealing element designed to close said opening in the reversed position of the sitting part.

It is thus possible to seal the opening for the passage of the base for securing the safety belt when the sitting part is in its reversed position such that this sitting part forms a closed cover for a housing.

It is thus possible to store objects in this housing so that they are inaccessible from the outside.

Further features of the seat according to the invention which are non-limiting and advantageous are as follows:
  said sealing element is in the form of an elongated shell with a first free end, the shape thereof being designed to seal said opening of the sitting part and a second free end which comprises securing means designed to secure this sealing element on said base for securing the safety belt;
  said sealing element is arranged such that a hollow side of the shell is oriented toward the inside of the sitting part;
  said means for securing the sealing element are means for clipping, designed to be clipped into said base for securing the safety belt;
  said first free end of the sealing element has a shape such that the external surface of this free end runs in the extension of the external surface of the base panel and the side panel of the sitting part;
  means for storing said sealing element are also provided;
  said means for storing said sealing element comprise two elastic straps arranged to the rear of the seatback part of this seat, designed to press the sealing element against the rear face of this seatback part.

The invention also relates to a motor vehicle comprising a seat as disclosed above.

BRIEF DESCRIPTION OF THE DRAWINGS

The description which follows with reference to the accompanying drawings and provided by way of non-limiting example will provide clear understanding of the invention and how it may be implemented.

In the accompanying drawings:
FIG. 1 is a schematic perspective view of the seat according to the invention with the sitting part in the reversed position and the sealing element in place so as to seal the opening for the passage of the base for securing the safety belt,
FIG. 2 is a schematic perspective view of the seat of FIG. 1, in which the sitting part is in the accommodating position and the sealing element is stored.

DETAILED DESCRIPTION

Figure 3:
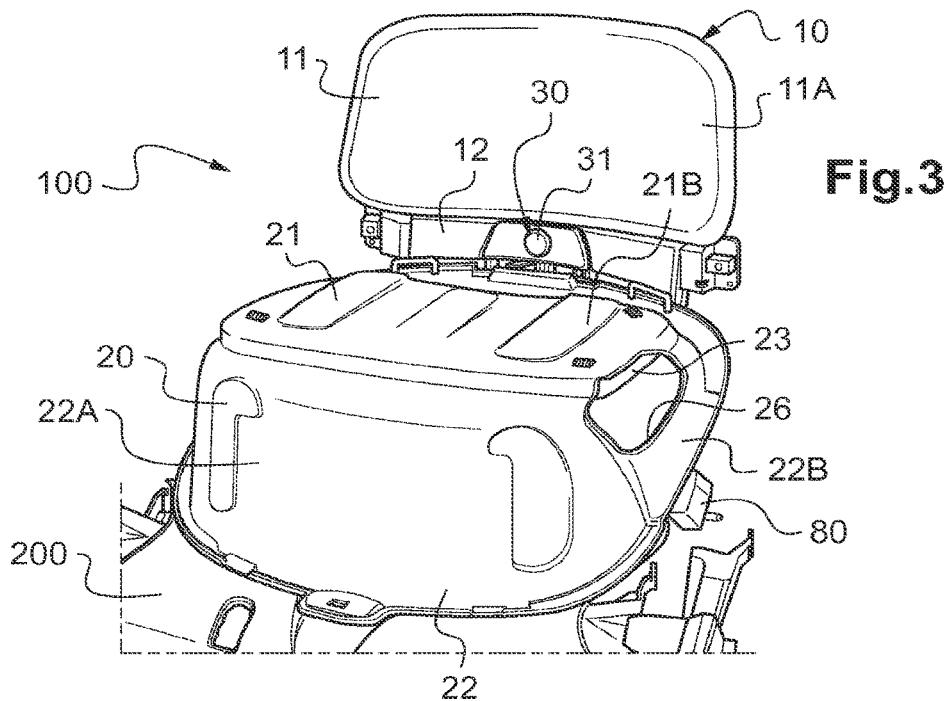
FIG. 3 is a schematic perspective view of the seat of FIG. 1 in which the sealing element is stored.

Firstly, it should be noted that the terms "front" and "rear", on the one hand, and the terms "upper" and "lower", on the other hand, will be used in the description with reference to the conventional orientation of a seat in a motor vehicle, in which the passenger seated on the seat faces the road in the forward direction.

A seat 100 for a motor vehicle according to the invention has been shown in FIGS. 1 to 3 and 8.

This seat 100 comprises a seatback part 10 and a sitting part 20.

The seatback part 10 in this case comprises an upper removable part 11 and a lower fixed part 12. The fixed part 12 of the seatback part 10 is fixed in a non-removable manner to the structure of the passenger compartment of the vehicle.

The removable part 11 comprises a framework covered by a textile covering 11A. It is mounted on the fixed part 12 of this seatback part 10.

This seatback part 10 is designed to extend substantially vertically in the motor vehicle according to the invention.

The sitting part 20 is shown, in the examples illustrated here, as a molded half-shell. It is produced, for example, from plastics material.

This sitting part 20 comprises a base panel 21 bordered at least partially by a side panel 22. It is designed to be mounted on the floor 200 of the vehicle in two different positions: a first accommodating position, shown in FIG. 1, in which the side panel 22 extends in a first direction to the rear of the base panel 21 and forms part of the seatback of the seat 100 and a second reversed position, shown in FIG. 2, in which the side panel 22 extends to the front of the base panel 21 in a second direction opposing the first direction.

Thus, in the reversed position, the sitting part 20 has been reversed by 180 degrees about an axis generally parallel to the base panel 21 and the seatback part 10.

In these two positions, the base panel 21 of the sitting part 20 is designed to extend substantially horizontally in the motor vehicle.

The base panel 21 comprises an upper face 21A oriented toward the passenger in the accommodating position of the sitting part 20 and an opposing lower face 21B (FIGS. 1 and 3) oriented toward the floor 200 of the vehicle in this accommodating position. A seat cushion 23 is provided on the upper face 21A of the base panel 21 (FIG. 2).

Here the base panel 21 has a generally rectangular shape, with very rounded corners. The side panel 22 in this case borders this base panel 21 along three first sides. It thus comprises a central portion 22A which extends along a longitudinal side of the base panel 21 and two end portions 22B which extend along the lateral sides of the base panel 21.

The second longitudinal side of the base panel 21 which is not bordered by the side panel 22 will be called hereinafter the front side of the base panel 21.

The free edge of the side panel 22 and the front side of the base panel 21 are surrounded by an edge 24 which extends toward the outside of the sitting part 20.

The part of this edge 24 which extends along the front side of the base panel 21 will be called hereinafter the front edge 24A of the sitting part 20. The part of this edge 24 which extends along the central portion 22A of the side panel 22 will be called hereinafter the rear edge 24B of the sitting part 20.

The side panel 22 rises from the upper face 21A of the base panel 21 and has a height relative to this base panel 21 which is variable.

More specifically, the height of the side panel 22 in this case is at a maximum on the central portion 22A bordering the part of the base panel 21 opposing said fourth side of the base panel 21. It then decreases along the end portions 22B until it joins the base panel 21 in the region of the front side of the base panel 21.

In the accommodating position of the sitting part (FIG. 2), the base panel 21 generally runs in the extension of the floor 200 of the vehicle. It thus seals an opening formed below the seat 100 in the floor 200.

The front edge 24A of the sitting part 20 is then oriented toward the front of the vehicle.

The central portion 22A of the side panel 22 thus runs in the extension of the seatback part 10 between this seatback part 10 and the base panel 21 of the sitting part 20. This central portion 22A of the side panel 22 thus forms, with the seatback part 10, the seatback of the seat 100.

It is understood that the central portion 22A of the side panel 22 is thus oriented toward the rear of the vehicle.

In this accommodating position, the sitting part 20 permits the user to be seated on the seat cushion 23 provided on the upper face 21A of the base panel 21. The user leans back against the central portion of the side panel 22 and the seatback part 10. The legs of the user pass over the front edge 24A of the sitting part 20.

In the reversed position of the sitting part (FIGS. 1 and 3) the base panel 21 extends between the seatback part 10 and the side panel 22 of the sitting part 20.

The lower face 21B of the base panel 21 is oriented toward the user and the upper face 21A of the base panel 21 is then oriented toward the floor 200 of the vehicle. Finally, the central portion 22A of the side panel 22 of the sitting part 20 is oriented toward the front of the vehicle.

In this reversed position, the base panel 21 is raised relative to the floor of the vehicle by the side panel 22. As a result, the sitting part 20 in this case delimits internally a housing where the user is able to store personal effects. This housing is all the larger since it is preferably located above the opening of the floor mentioned above. This opening of the floor 200 opens more specifically into a free space located below the seat.

The sitting part 20 thus forms a storage compartment.

In order to ensure the securing of the sitting part 20 of the seat 100 in the vehicle, the sitting part 20 comprises means for mounting 40 on the floor 200 of the vehicle in its two accommodating and reversed positions.

These means for mounting 40 are designed to cooperate with complementary means for mounting 210 of the floor of the vehicle.

In this case, said means for mounting are pivotable means for mounting, for example by hooking, interlocking or by means of slide bars.

The sitting part 20 also comprises means for hooking 50 designed to cooperate with complementary means for hooking 60 of the seatback part 10 in the two accommodating and reversed positions, so as to hook the sitting part 20 to the seatback part 10.

Finally, the seat 100 comprises locking means 30 designed to lock the sitting part 20 in its two accommodating and reversed positions.

These locking means 30 comprise in this case a single lock 31 belonging to the seatback part 10 and means for cooperation with this lock in the two accommodating and reversed positions belonging to the sitting part 20. These means for cooperation comprise, for example, for each of the two positions of the sitting part 20, a housing designed to receive a bolt of the lock 31 which blocks any movement of the sitting part.

It is noteworthy that the sitting part also comprises an opening 26 (FIGS. 1 to 3) designed for the passage of a base for securing 80 a safety belt (FIGS. 2, 6 and 7) when the sitting part 20 is in its accommodating position.

As FIGS. 1 to 3 show, the opening 26 for the passage of the base for securing 80 the safety belt is in this case generally formed in a rear corner of the sitting part 20.

More specifically, it overlaps one of the end portions 22B of the side panel 22 and the base panel 21 of the sitting part 20.

This opening has an oblong shape. It extends along a part of the seat cushion 23 of the sitting part 20.

Figure 6:
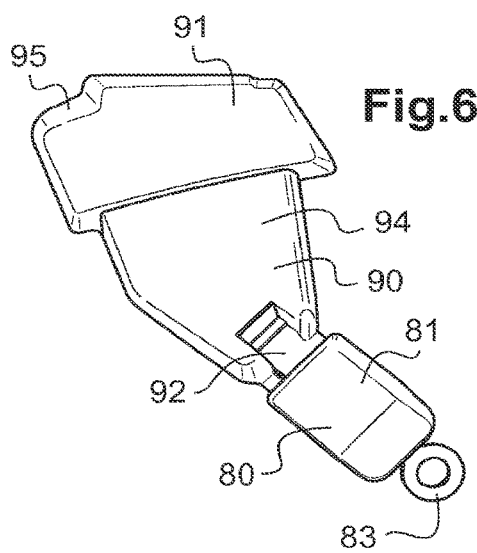
FIG. 6 is a front schematic view of the sealing element of FIG. 4 in position in the base for securing the safety belt.
Figure 7:
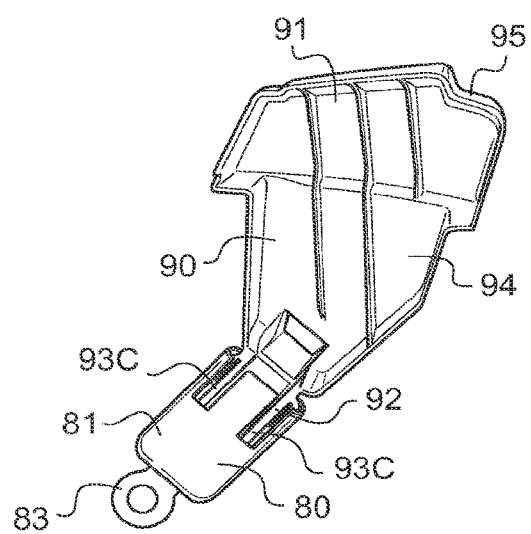
FIG. 7 is a rear schematic view of the sealing element of FIG. 6,
  FIGS. 8 to 11 are schematic views of the seat of FIG. 1 in several key stages of the reversal of the sitting part.

As FIGS. 2, 6 and 7 more particularly show, the base for securing 80 the safety belt comprises a housing 81, means for securing the safety belt being housed therein.

These means for securing are in this case means for securing by clipping, comprising for example a clipping tooth. These means for securing are designed to cooperate with complementary means of the safety belt for the securing thereof. This refers, for example, to a small plate comprising an aperture, the clipping tooth being hooked onto the edge thereof.

This small plate is inserted into a slot of the housing 81 and is thus guided until it clips into the means for clipping of the base for securing 80.

A push button 82 which is accessible from one of the ends of the housing 81 may be actuated to disengage the clipping tooth from the aperture and permit the removal of the safety belt.

The housing 81 comprises at its other end means for mounting 83 on the structure of the passenger compartment of the vehicle, for example by screwing.

The housing 81 of the base for securing 80 the safety belt is thus mounted fixedly and rigidly in the vicinity of the seat 100.

Moreover, the seat 100 thus comprises a sealing element 90 designed to close this opening 26 in the reversed position of the sitting part 20.

Figure 5:
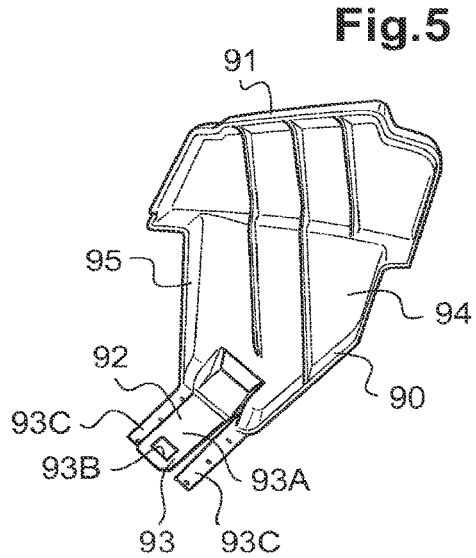
FIG. 5 is a rear schematic view of the sealing element of FIG. 4.

The sealing element 90 is more particularly shown in FIGS. 5 to 7.

Said sealing element is in the form of an elongated shell with a first free end 91, the shape thereof being designed to seal said opening 26 of the sitting part 20 and a second free end 92 which comprises securing means 93 designed to secure this sealing element 90 to said base for securing 80 the safety belt.

The shell forming the sealing element 90 in this case comprises a principal wall 94 surrounded by a peripheral wall 95 which extends substantially perpendicular to the principal wall 94.

The face of the principal wall 94 of the sealing element 90 which is turned toward the peripheral wall 95 may be ribbed in order to reinforce its rigidity.

More specifically, as FIG. 1 shows, the first free end 91 of the sealing element has a shape such that the external surface 91A of this free end 91 runs in the extension of the external surface of the base panel 21 and the side panel 22 of the sitting part 20.

The external surface of the base panel 21 and the side panel 22 of the sitting part 20 is defined here as the surface oriented toward the exterior of the sitting part 20. This is the rear face 21B of the base panel 21 and the external face of the side panel 22 which extends this rear face 21B of the base panel 21.

The principal wall 94 of the sealing element 90 is oriented toward the side panel 22 adjacent to the sitting part 20. As a result, the hollow part of the shell forming this sealing element 90 is open toward the inside of the sitting part 20.

The sealing element 90 thus occupies a minimal volume below the sitting part 20.

The means for securing 93 the sealing element are means for clipping designed to be clipped into said base for securing 80 the safety belt.

They comprise in this case a tongue 93A which extends from the peripheral wall 95. At the end of this tongue 93A is formed an aperture 93B designed to cooperate with the means for clipping the base for securing 80 the safety belt.

The securing means 93 also comprise guide means designed to guide the tongue 93A into the slot of the housing 81 of the base for securing 80.

These guide means comprise two posts 93C which extend from the free edge of the peripheral wall 95, on both sides of the tongue 93A.

When the sealing element 90 is approached by the housing 81 of the base for securing 80, the two posts 93C slide along one of the external faces of this housing 81 and the tongue 93A slides in the slot of the housing 81 so that the aperture 93B of this tongue 93A is hooked onto the hooking tooth housed in the base for securing 80 the safety belt.

When the sealing element 90 is clipped into the base for securing 80, it is impossible to remove this sealing element 90 without the actuation of the push button 82.

Advantageously, the seat 100 also comprises means for storing 18 said sealing element.

Figure 12:
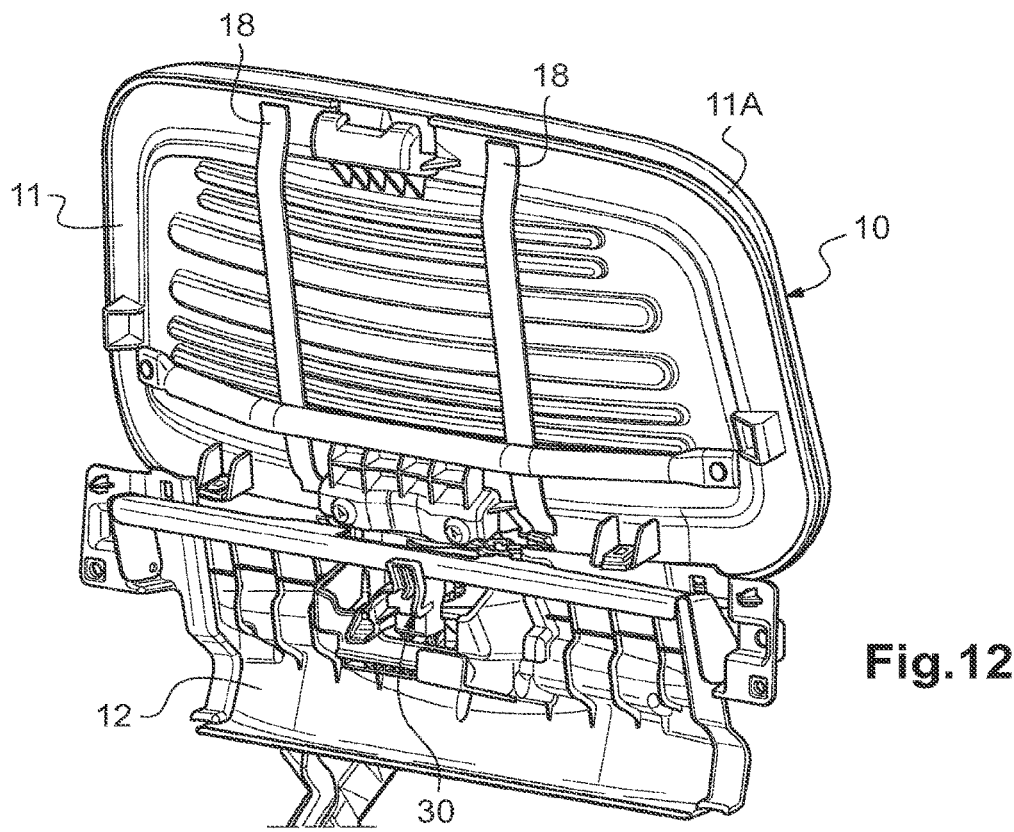
FIG. 12 is a rear schematic view of the seatback part of the seat of FIG. 1.
Figure 4:
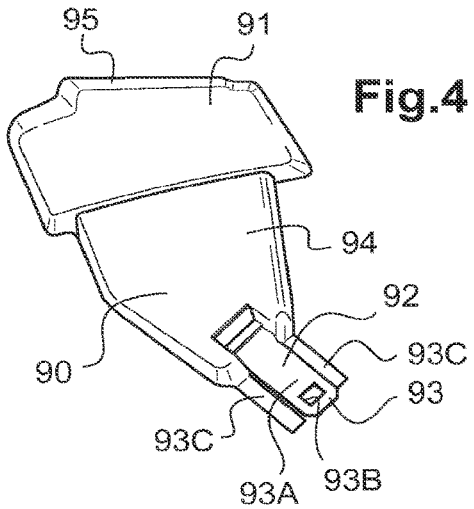
FIG. 4 is a front schematic view of the sealing element of the seat of FIG. 1.

In the example shown in the figures, these storage means 18 comprise two elastic straps 18 arranged to the rear of the seatback part 10 of this seat 100 (see FIG. 12).

These two elastic straps 18 are designed to press the sealing element 90 against the rear face of this seatback part 10.

More specifically, the two elastic straps 18 are fixed to the rear of the mobile part 11 of the seatback part 10. They extend in a substantially vertical direction to the rear of the seatback part 10.

Method

The implementation of the seat according to the invention will now be described in more detail.

The sitting part is initially shown in its accommodating position, shown in FIG. 1.

The sealing element 90 is stored in this accommodating position. It is slid between the elastic straps 18 and the rear face of the mobile element 10 of the seatback part.

When the user wishes to reverse the sitting part 20 of the seat 100, for example to arrange personal effects in the storage compartment formed by the reversed sitting part, the user carries out the following steps:

gripping the sitting part 20 and detaching it from the floor 200 and the seatback part 10, removing the sealing element 90 from its stored position, clipping the sealing element 90 into the base for securing the safety belt of the seat 100, reversing the sitting part and placing it in the seat in the reversed position.

During this last step, the opening 26 of the sitting part 20 surrounds the first free end 91 of the sealing element 90 in a contiguous manner.

At the same time, a first part of this first free end 91 bears against the seat cushion 23 of the sitting part 20. A second part of this first free end 91 bears against the internal face of the side panel 22 of the sitting part 20.

More specifically, in this case, to detach the sitting part 20 from the floor 200 and the seatback part 10, the user releases the means for mounting and the means for hooking of this sitting part 20 from their cooperation with the complementary means for hooking of the seatback part 10, on the one hand, and with the complementary means for mounting of the floor 200, on the other hand.

Firstly, the user introduces a suitable key into the cylinder of the lock 31 which is accessible from the front face of the seatback part 10.

Figure 8:
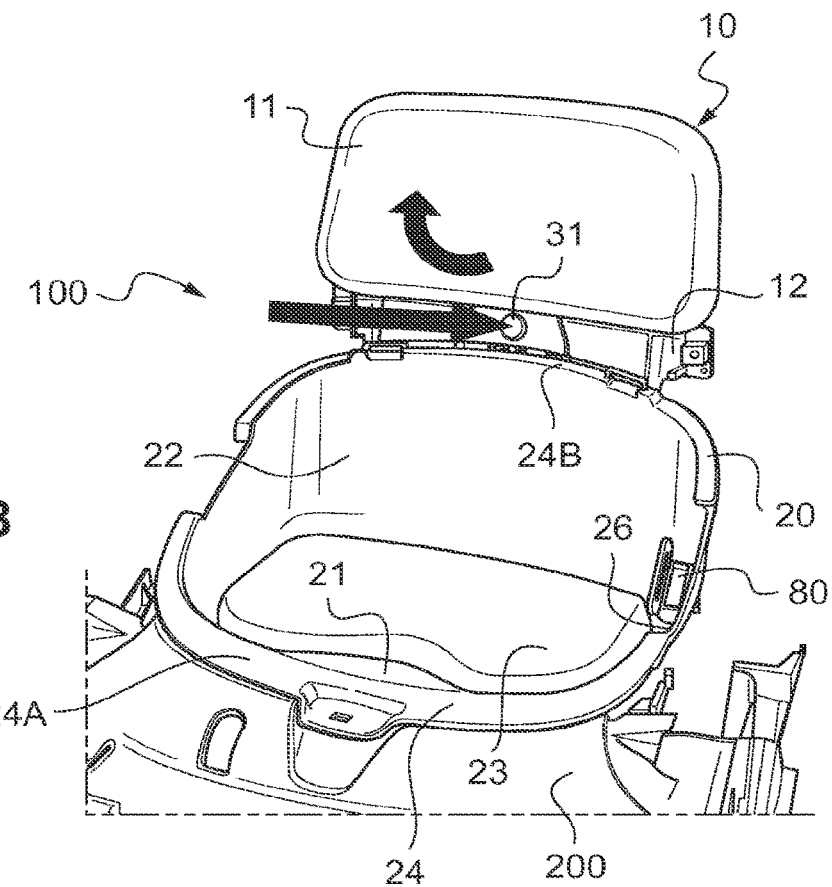

The user unlocks the sitting part 20 by turning the key in the lock 31 (FIG. 8).

Figure 9:
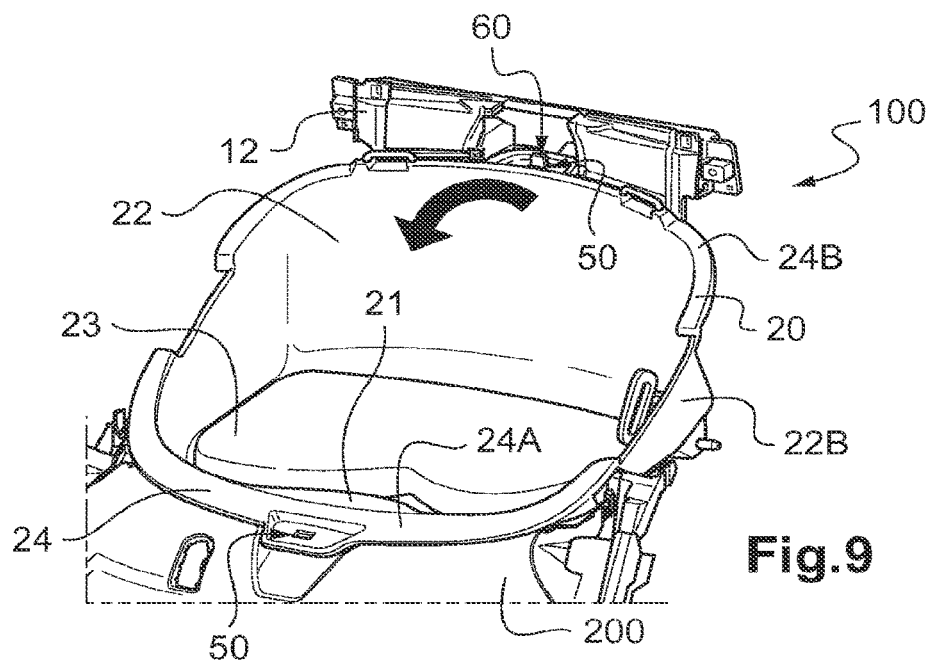

The sitting part 20 is then able to be pivoted on the floor 200 due to its means for mounting (FIG. 9).

However, the sitting part 20 remains held on the floor and on the seatback part 10 by the cooperation of the means for mounting and the means for hooking of the sitting part 20 with the complementary means described above.

Then in order to permit the pivoting of the sitting part 20, the user detaches the removable part 11 of the seatback part 10 from its fixed part 12.

The user pivots the sitting part 20 relative to the floor of the vehicle about a pivot axis located in the vicinity of the front edge 24A (FIG. 9). At the same time, the means for hooking of the sitting part 20 are released from their cooperation with the complementary means for hooking of the seatback part.

The user raises the sitting part 20 so as to release the means for mounting of the sitting part 20 from their cooperation with the complementary means for mounting of the floor of the vehicle.

The user removes the sealing member 90 from the elastic straps 18 which hold said sealing member behind the removable part 11 of the seatback part 10. The user clips it in the base for securing 80.

The user reverses the sitting part 20 so as to arrange its base panel 21 between the seatback part 10 and its side panel 22.

The user returns the means for mounting of the sitting part 20 into cooperation with the complementary means for mounting of the floor 200 of the vehicle.

The user then pivots said sitting part 20 until the means for hooking of the sitting part 20 on the seatback part 10 of the seat 100 cooperate with the complementary means for hooking of the seatback part 10 (FIG. 10). At the same time, the opening 26 of the sitting part 20 comes to bear against the first end 91 of the sealing element 90 (FIG. 11).

The user reassembles the removable part of the seatback 11 on its fixed part 12, for example by clipping.

Finally, the user locks said locking means 30.

The sitting part 20 is then in the locked reversed position of FIG. 1.

As said first free end 91 of the sealing element 90 has a shape such that the external surface of this free end runs in the extension of the external surface of the base panel and the side panel of the sitting part, the sealing element 90 comes into contact with the external surface of the sitting part and remains separate. As the sealing element 90 is surrounded by the opening 26 in a contiguous manner, any movement of the sealing element 90 is thus prevented.

The production of the sealing element in the form of a hollow shell permits a maximum internal space to be created below the reversed sitting part.

The storage space located below the sitting part is thus secured, whilst being protected.

As a variant, naturally it is conceivable for the sealing element to be formed from a solid block.

The invention claimed is:

1. A motor vehicle seat comprising:
    a sitting part including a base panel bordered at least partially by a side panel, the sitting part configured to be mounted on the floor of the vehicle in two different positions of: a first accommodating position in which the side panel extends in a first direction at the rear of the base panel and forms a portion of a seatback of the seat, and a second reversed position in which the side panel extends in front of the base panel in a second direction opposing the first direction;
    the sitting part further comprises an opening configured for passage of a base for securing a safety belt when the sitting part is in the accommodating position; and
    a sealing element configured to close the opening in the reversed position of the sitting part.

2. A motor vehicle comprising a seat as claimed in claim 1.

3. The motor vehicle seat as claimed in claim 1, further comprising means for storing the sealing element.

4. The motor vehicle seat as claimed in claim 3, wherein the means for storing the sealing element includes two elastic straps arranged to a rear of the seatback of the seat, configured to press the sealing element against a rear face of the seatback.

5. The motor vehicle seat as claimed in claim 1, wherein the sealing element is in a form of an elongated shell with a first free end, a shape thereof configured to seal the opening of the sitting part and a second free end which includes securing means configured to secure the sealing element on the base for securing the safety belt.

6. The motor vehicle seat as claimed in claim 5, wherein the sealing element is arranged so that a hollow side of the shell is oriented toward an inside of the sitting part.

7. The motor vehicle seat as claimed in claim 5, wherein the means for securing the sealing element includes means for clipping, configured to be clipped into the base for securing the safety belt.

8. The motor vehicle seat as claimed in claim 5, wherein the first free end of the sealing element has a shape such that an external surface of the first free end runs in an extension of an external surface of the base panel and the side panel of the sitting part.

9. The motor vehicle seat as claimed in claim 5, wherein the means for securing the sealing element includes a tongue extending from a wall of the sealing element, the tongue including an aperture configured to be hooked onto the base for securing.

* * * * *